United States Patent
Redmond et al.

(10) Patent No.: US 12,525,087 B2
(45) Date of Patent: Jan. 13, 2026

(54) CUP DISPENSER SENSOR FOR AUTOMATICALLY GENERATING REFILL ALERTS

(71) Applicant: 7-Eleven, Inc., Irving, TX (US)

(72) Inventors: Matthew O'Daniel Redmond, Denton, TX (US); John Robert Keller, Plano, TX (US)

(73) Assignee: 7-Eleven, Inc., Irving, TX (US)

( * ) Notice: Subject to any disclaimer, the term of this patent is extended or adjusted under 35 U.S.C. 154(b) by 1064 days.

(21) Appl. No.: 17/455,878

(22) Filed: Nov. 19, 2021

(65) Prior Publication Data

US 2023/0162555 A1    May 25, 2023

(51) Int. Cl.
*G07F 13/10*    (2006.01)

(52) U.S. Cl.
CPC .................................. *G07F 13/10* (2013.01)

(58) Field of Classification Search
CPC ...................................................... G07F 13/10
See application file for complete search history.

(56) References Cited

U.S. PATENT DOCUMENTS

| | | | | |
|---|---|---|---|---|
| 6,189,727 B1 * | 2/2001 | Shoenfeld | ........... | G07F 17/0092 221/279 |
| 8,941,495 B2 * | 1/2015 | Wiese | ..................... | G08B 13/08 340/568.8 |
| 9,940,770 B1 * | 4/2018 | Chang | ...................... | G07D 1/02 |
| 10,743,679 B2 * | 8/2020 | McKeever | .............. | A47F 1/065 |
| 11,560,299 B2 * | 1/2023 | Gracki | .................. | B67D 1/1277 |
| 11,704,647 B2 * | 7/2023 | Drago | ..................... | G07F 11/02 705/28 |
| 2003/0051970 A1 * | 3/2003 | Furneaux | ................. | G07D 1/00 194/200 |
| 2007/0060445 A1 * | 3/2007 | Reinkensmeyer | ... | A61B 5/4528 601/1 |
| 2008/0004692 A1 * | 1/2008 | Henson | ............ | A61B 17/12022 623/1.18 |
| 2011/0248041 A1 * | 10/2011 | Dooley | .................... | A47F 1/065 221/3 |
| 2013/0240554 A1 * | 9/2013 | Strahlin | ................. | A47K 10/32 221/6 |
| 2019/0054252 A1 * | 2/2019 | Amschler | ............... | A61M 5/24 |
| 2021/0361288 A1 * | 11/2021 | Strassner | ........... | A61B 17/1155 |

* cited by examiner

*Primary Examiner* — Gene O Crawford
*Assistant Examiner* — Kelvin L Randall, Jr.
(74) *Attorney, Agent, or Firm* — Baker Botts L.L.P.

(57) ABSTRACT

A system for providing a measure of a number of cups housed within a cup dispenser includes a sensor and a computing system. The cup dispenser includes a body configured to house a stack of cups, and a plunger configured to engage a first cup of the stack of cups and to bias the stack of cups toward a discharge opening defined by a first end of the body. The sensor is coupled to the plunger and is configured to measure a distance from the plunger to a second end of the body, and to transmit the measured distance across a network. The computing system receives the measured distance from the network, and determines, based on the measured distance, the measure of the number of cups housed within the cup dispenser. In response to determining that the number of cups is less than the threshold, the system transmits an alert.

11 Claims, 3 Drawing Sheets

CUP DISPENSER SENSOR FOR AUTOMATICALLY GENERATING REFILL ALERTS

TECHNICAL FIELD

The present disclosure relates generally to sensors, and more specifically to a cup dispenser sensor for automatically generating refill alerts.

BACKGROUND

Disposable cup dispensers are used by many businesses that offer beverages to customers. For example, cup dispensers may be used to dispense cups to hold coffee, fountain drinks, frozen drinks, water, etc. For many types of cup dispensers, it is difficult to determine the number of disposable cups remaining within the dispenser, prior to the dispenser reaching an empty state. For example, the body of the cup dispenser may be made from an opaque material, and/or the body of the cup dispenser may be built into and/or housed within a wall or cabinet, preventing identification of the fill level of the cup dispenser from visual inspection alone.

SUMMARY

This disclosure contemplates a cup dispenser sensor system that is configured to automatically monitor a cup dispenser to determine the fill level of the cups within the dispenser, and to create an alert for display on a user device when the fill level falls below a desired threshold (e.g., when less than a threshold number of cups remain within the dispenser). In particular, the system includes a sensor that is coupled to the cup dispenser and configured to measure a distance along the length of the cup dispenser over which no cups are housed (e.g., a distance from the last cup in the dispenser to the end of the dispenser). The sensor is configured to transmit this distance to a remote computing system. The computing system converts the distance into a measure of the fill level of the cup dispenser (e.g., a measure of the percentage of the maximum number of cups that may be housed within the cup dispenser that are remaining within the dispenser, a measure of the number of cups remaining within the dispenser, etc.), and compares the measure of the fill level to a threshold. If the fill level compares unfavorably to the threshold (e.g., the percentage of cups remaining within the dispenser is less than a specified percentage; the number of cups remaining within the dispenser is less than a specified number, etc.), the computing system transmits the alert to the user device, prompting the user of the device to refill the cup dispenser. In this manner, certain embodiments of the system reduce the likelihood that a cup dispenser will reach an empty state, by providing sufficient advanced notice of a need to refill the cup dispenser when the cup dispenser begins to approach the empty state.

Furthermore, because cups may be removed from the cup dispenser at a faster or slower rate depending on a time of day, in certain embodiments, the computing system is configured to compare the cup dispenser fill level to different thresholds, depending on the time of day. For example, the system may notify a user to refill a coffee cup dispenser at a higher fill level during the morning, when demand for coffee is high, while the system may notify a user to refill a cup dispenser at a lower fill level late at night, when demand for beverages may be low. In this manner, certain embodiments help to reduce the likelihood that the cup dispenser will reach the empty state, while nevertheless avoiding the generation of unnecessary refill alerts. An embodiment of the system is described below.

According to an embodiment, a system for providing a measure of a number of cups housed within a cup dispenser includes a first sensor and a computing system communicatively coupled to the first sensor. The cup dispenser includes a body configured to house a stack of cups, a spring disposed within the body, and a plunger coupled to the spring. The plunger is configured to engage a first cup of the stack of cups and to bias the stack of cups toward a discharge opening defined by a first end of the body. The first sensor is coupled to the plunger and is configured to measure a distance from the plunger to a second end of the body. The second end is opposite the first end. The first sensor is also configured to transmit the measured distance across a network. The computing system includes a memory and a hardware processor communicatively coupled to the memory. The memory stores a threshold. The hardware processor receives the measured distance from the network. The processor also determines, based on the measured distance, the measure of the number of cups housed within the cup dispenser. In response to determining that the number of cups is less than the threshold, the processor transmits an alert for display on a user device.

The disclosed embodiments provide several practical applications and technical advantages. As an example, certain embodiments automatically cause an alert to appear on the screen of a user device, automatically cause the user device to generate a sound in response to receiving an alert, and/or automatically cause the user device to vibrate in response to receiving an alert. Accordingly, certain embodiments automatically inform a user of the alert, without requiring the user to repeatedly check his/her device to determine if an alert has been received, thereby conserving the computational resources otherwise expended during such actions. For example, certain embodiments automatically power on the device's screen and display the alert in a pop-up window, thereby automatically and efficiently displaying the alert to the user. This is in contrast to other monitoring systems in which a user may be required to (1) enter his/her passcode to unlock a device, (2) navigate to an application stored on the device, (3) open the application, and (4) navigate to monitoring data available through the application.

As another example, certain embodiments automatically adjust the threshold against which a cup dispenser fill level measure is compared, based on demand for the cups housed within the cup dispenser. For example, certain embodiments automatically increase the fill level threshold against which the fill level measure is compared, when demand for the cups housed within the dispenser is high, and decrease the fill level threshold against which the fill level measure is compared, when demand for the cups housed within the dispenser is low. In this manner, certain embodiments help to reduce the likelihood that the cup dispenser will reach an empty state, while nevertheless avoiding the generation of unnecessary alerts. Accordingly, certain such embodiments may conserve the computational resources that would be associated with the generation of such unnecessary alerts. For example, during periods of low demand for cups, the foot traffic through the building that houses the cup dispenser will likely also be low and therefore workers within the building will likely have available time to check on and restock the cup dispensers within the building before they are at risk of reaching an empty state. Accordingly, transmitting an alert to such workers during such times (which involves the use of processing and network resources) is likely unnecessary to help ensure that cups are always available.

As a further example, certain embodiments of the system are configured to obtain alert thresholds for use with one or more cup dispenser sensors located within a physical building from those that are used with cup dispenser sensors located in similar, nearby buildings. For example, the system may be configured to obtain alert thresholds for one or more cup dispensers belonging to an entity that has recently set up operations in a new building from those that are used with cup dispenser sensors located in one or more similar buildings (e.g., buildings operated by the same entity), which are located within a given radius of the new building. As an example, in certain embodiments, the system may be configured to generate an average of the alert thresholds used with cup dispenser sensors located within the similar buildings, and to use such average as the alert threshold associated with the cup dispenser sensors located within the new building. In this manner, certain embodiments may help to increase the likelihood that maintenance issues associated with such thresholds are addressed prior to the issues impacting customers, while nevertheless avoiding the generation of unnecessary alerts (and the waste of computational resources associated with such unnecessary alerts).

Certain embodiments may include none, some, or all of the above technical advantages and practical applications. One or more other technical advantages and practical applications may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
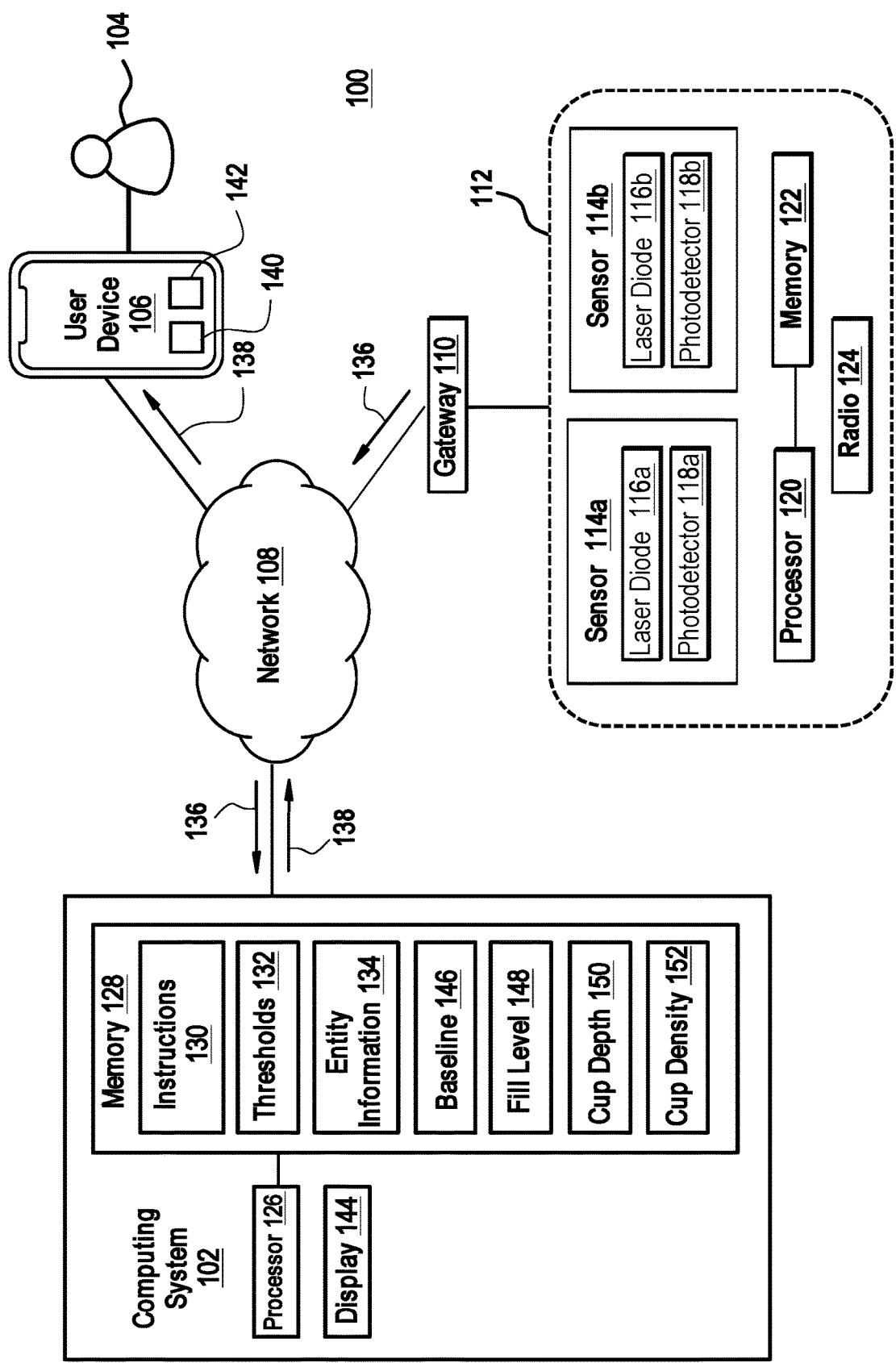
FIG. 1 is a schematic diagram of a cup dispenser monitoring system, according to certain embodiments.
Figure 2:
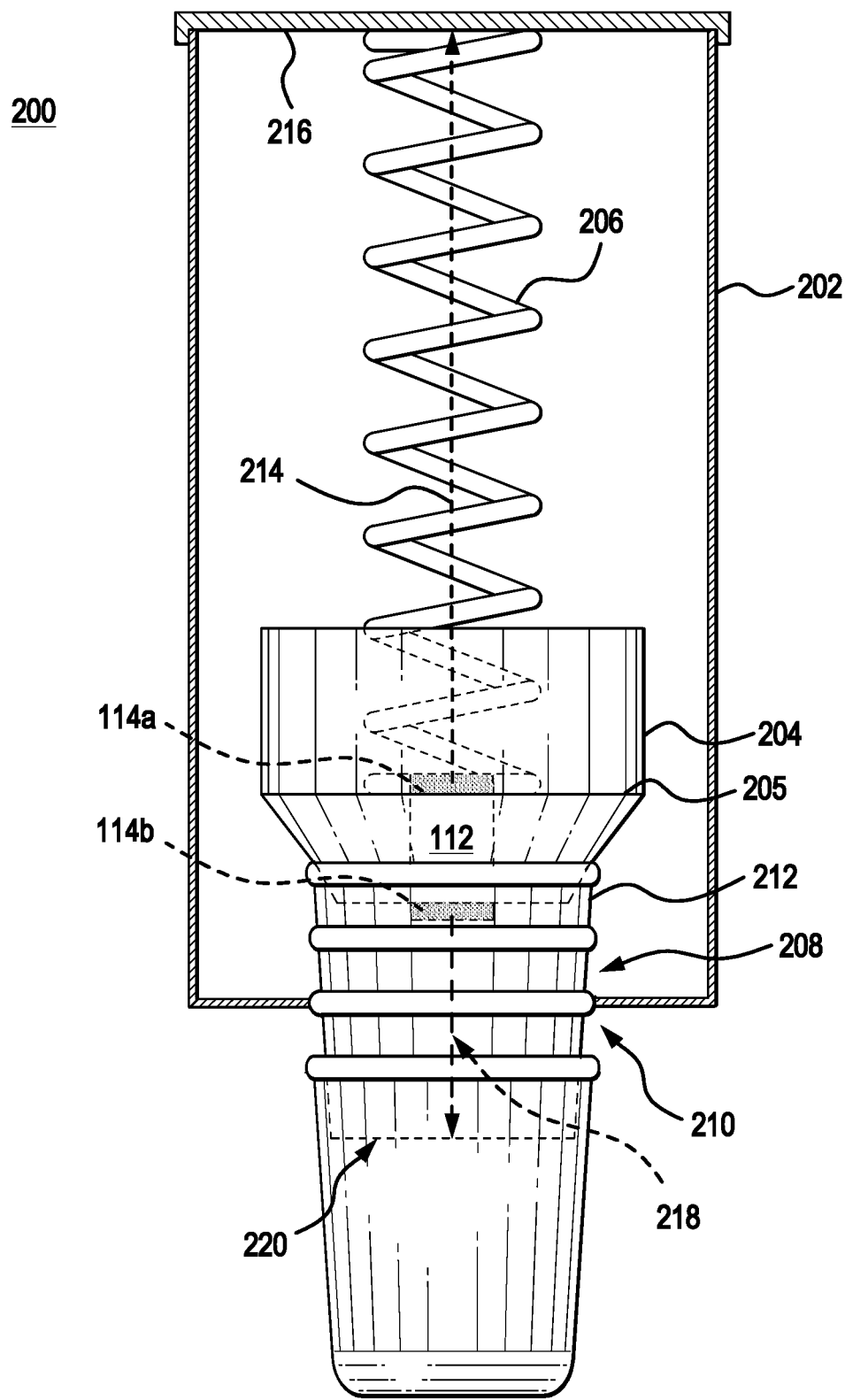
FIG. 2 illustrates the sensors of the system of FIG. 1 mounted within a cup dispenser.
Figure 3:
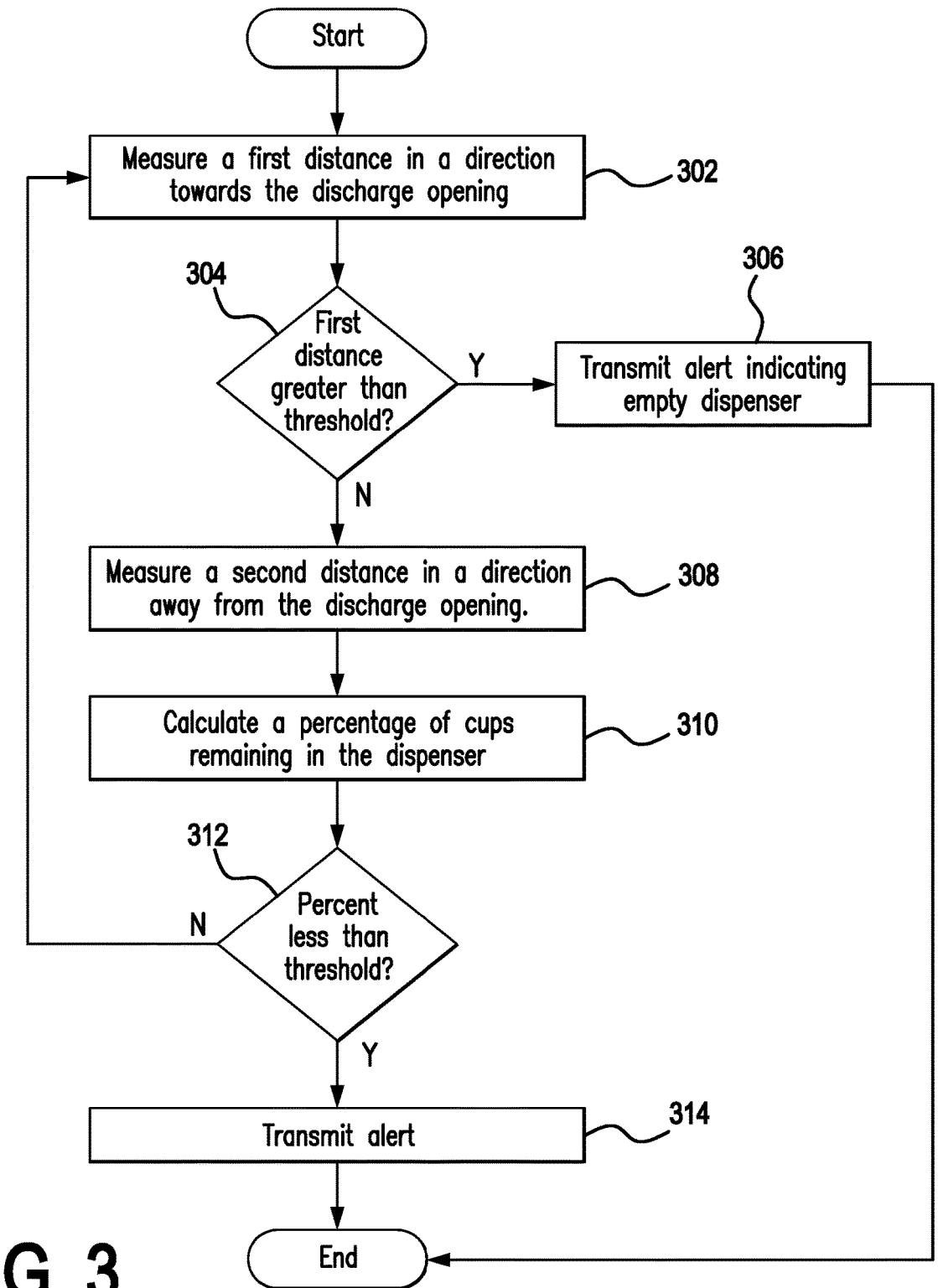
FIG. 3 presents a method for monitoring the fill level of a cup dispenser, according to certain embodiments

Embodiments of the present disclosure and its advantages are best understood by referring to FIGS. 1 through 3 of the drawings, like numerals being used for like and corresponding parts of the various drawings.

I. System Overview

FIG. 1 illustrates an example automatic cup dispenser monitoring system 100 that is designed to automatically monitor the fill level of a cup dispenser, and to alert a user device when that fill level falls below a threshold. In this manner, certain embodiments of the system are able to automatically alert a worker when a cup dispenser within the entity may need to be refilled, thereby enabling the worker to refill the cup dispenser before the cup dispenser reaches an empty state, without requiring the worker to proactively monitor the number of cups remaining within the dispenser.

As illustrated in FIG. 1, automatic cup dispenser monitoring system 100 includes remote computing system 102, user(s) 104, device(s) 106, network 108, gateway 110, and sensor device 112. Sensor device 112 is disposed within a cup dispenser, as illustrated in FIG. 2, and includes one or more sensors 114a/b. Sensors 114a/b are configured to measure one or more distances within the cup dispenser, from which a fill level of the cup dispenser may be determined, as described in further detail below and in the discussion of FIG. 2. Sensor device 112 is configured to transmit the measurements made by sensors 114a/b directly or indirectly to remote computing system 102 and/or device 106 using network 108 and/or gateway 110. Computing system 102 and/or device 106 is configured to use the measured distances to determine a fill level for the cup dispenser. As an example, in certain embodiments, device 106 is configured to use the measured distances to determine a fill level for the cup dispenser and to automatically generate and display an alert 138 if the determined fill level compares unfavorably to the threshold. As another example, in certain embodiments, computing system 102 may provide information associated with the determined fill level to user device 106. For instance, computing system 102 may compare the determined fill level to one or more thresholds 132, and transmit an alert 138 to user device 106 if the fill level compares unfavorably to the threshold(s). The manner by which computing system 102 performs these functions is described in further detail below, and in the discussion of FIGS. 2 and 3.

Device(s) 106 are used by user(s) 104 (e.g., workers within a physical location housing one or more cup dispensers) to communicate with remote computing system 102. As an example, user 104 may use device 106 to (1) receive an alert 138 from computing system 102 indicating that a fill level of a cup dispenser is below a desired threshold, and (2) display the alert to user 104. Device 106 may display alert 138 to user 104 in any suitable manner. For example, in certain embodiments, device 106 may generate a pop-up message that includes the alert, and automatically display the pop-up message on a screen of device 106. In some embodiments, device 106 may generate a sound and/or vibration in response to receiving alert 138. In certain embodiments, device 106 may display a graphical user interface (GUI) on a screen of device 106 within which the alert may be displayed. As further examples, in some embodiments, device 106 may receive alert 138 through an email and/or text message. After receiving the alert 138, user 104 may refill the cup dispenser associated with the alert.

In certain embodiments, device(s) 106 may receive the distance measurements 136 made by sensors 114a/b, convert those measurements into a measure of the fill level of the cup dispenser, compare the fill level to a threshold 129, and generate and display an alert 138 when the fill level compares unfavorably to the threshold. In particular, memory 136 of device 106 may include instructions (which may be the same or similar to instructions 130) that, when executed by processor 134 of device 106, enable the device to perform such functions.

User device 106 is any appropriate device for communicating with components of remote computing system 102 over network 108, and notifying user 104 to an alert 138 received from remote computing system 102. For example, user device 106 may be a handheld computing device such as a smartphone, wearable computer glasses, a smartwatch, a tablet computer, a laptop computer, and the like. User device 106 may include an electronic display, a keypad, or other appropriate terminal equipment usable by user 104. For instance, the electronic display of user device 106 may be configured to display an alert 138 that is provided by remote computing system 102. In some embodiments, an application stored in a memory 140 of the device 106 and executed by a processor 142 of the device 106 may perform the functions described herein.

Network 108 allows communication between and amongst the various components of system 100. For example, computing system 102, user device 106, and/or gateway 110 may communicate via network 108. This disclosure contemplates network 108 being any suitable network operable to facilitate communication between the components of system 100. Network 108 may include any interconnecting system capable of transmitting audio, video, signals, data, messages, or any combination of the preceding. Network 108 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Sensor device 112 is a computing device that is housed either partially or wholly within a cup dispenser (e.g., cup dispenser 200, illustrated in FIG. 2). Sensor device 112 includes one or more sensors 114a/b, processor 120, memory 122, and radio 124. In general, sensor device 112 provides sensor data 136 to computing system 102 and/or user device 106. Various embodiments of sensor data 136 are described in further detail below.

Each sensor 114a/b is configured for sensing or measuring a physical distance to a surface (e.g., a surface within a cup dispenser). As an example, in certain embodiments and as illustrated in FIG. 1, each sensor 114a/b may be a time of flight (ToF) sensor that uses a laser to produce a beam of infrared light that is bounced off an object and returned to the sensor 114a/b in order to measure distance to the object. In such embodiments, each sensor 114a/b may include a laser diode 116a/b and a photodetector 118a/b. Each laser diode 116a/b may produce a laser beam that travels towards a surface, wherein the laser beam is then reflected off of the surface to travel back to the sensor 114a/b. Each laser diode 116a/b may produce pulses of laser beams at a pre-determined frequency. Each photodetector 118a/b may be any appropriate device operable to receive each reflected laser beam. In one or more embodiments, a sensor processor 120 and/or sensor memory 122 may be communicatively coupled to each laser diode 116a/b and photodetector 118a/b. Sensor processor 120 may be configured to execute instructions stored within sensor memory 122 to determine a distance measurement 136 based on a difference in time between production of the laser beam by the laser diode 116a/b and reception of the reflected laser beam by the photodetector 118a/b.

As another example, in some embodiments, sensors 114a/b may correspond to ultrasonic sensors. For example, each sensor 114a/b may include a transducer configured to send and receive ultrasonic pulses. In particular, each sensor 114a/b may be configured to emit a high-frequency sound pulse towards a surface, and to calculate a distance to that surface based on the time taken by the echo signal to travel back after reflecting from the surface.

Further details of the use of sensors 114a/b within a cup dispenser, including a description of the locations within the cup dispenser at which the sensors may be positioned, and the distances within the cup dispenser for which the sensors are configured to measure, are provided below, in the discussion of FIG. 2.

While FIG. 1 illustrates a pair of sensors 114a and 114b, this disclosure contemplates that sensor device 112 may include any suitable number and combination of one or more sensors 114. Furthermore, while FIG. 1 illustrates each sensor 114a and 114b as sharing processor 120, memory 122, and radio 124, in certain embodiments, each sensor 114a/b may be associated with its own processor 120, memory 122, and/or radio 124 (e.g., each sensor 114a/b may operate independently of the other sensor 114a/b).

Sensor device 112 is configured to provide the distances measured by sensors 114a/b to remote computing system 102 and/or user device 106. These distance measurements 136 may include any appropriate distance values (e.g., inches, centimeters, millimeters, etc.). In some embodiments, sensor device 112 is configured to provide distance measurements 136 automatically to computing system 102. For example, sensor device 112 may be configured to provide distance measurements 136 to computing system 102 periodically (e.g., every five minutes), at random time intervals, and/or at any other suitable times. For instance, in some embodiments, in order to conserve power, sensor device 112 may be configured to provide distance measurements 136 when certain conditions associated with the cup dispenser to which the device is coupled are met (e.g., the distance measurements indicate that the fill level within the cup dispenser has fallen below a threshold value). In some embodiments, sensor device 112 is configured to provide distance measurements 136 to computing system 102 when requested to do so by the computing system.

Sensor device 112 may be configured to operate in a manner that conserves power (e.g., battery power). For example, in some embodiments, sensor device 112 may remain in a low power consumption "sleep" mode for extended periods of time. While in sleep mode, sensor device 112 may consume less power by reducing or avoiding using components such as radio 124 and/or sensors 114a/b. In these embodiments, sensor device 112 may wake from the sleep mode after a predetermined amount of time (e.g., every five minutes), measure distances within the associated cup dispenser, transmit distance measurements 136 to computing system 102 and/or device 106, and then return to sleep mode. As a result, embodiments of sensor device 112 that use batteries for power may be able to operate for a longer duration of time before requiring new batteries.

In certain embodiments, sensor device 112 (and/or the sensors 114a/b associated with the device) may operate as an Internet-of-Things (IoT) device. In general, IoT describes a network of physical objects (or "things") that are embedded with sensors, software, and other technologies for the purpose of connecting and exchanging data with other devices and systems over the internet. In embodiments where sensor device 112 is an IoT device, system 100 may include a gateway 110 for communicating with sensor device 112. Gateway 110 may be any appropriate IoT gateway, computer system, or electronic device that is capable of wirelessly communicating with sensor device 112 using any appropriate IoT communications protocol. Without limitations, the IoT communications protocol may include message queuing telemetry transport (MQTT), constrained application protocol (CoAP), advanced message queuing protocol (AMQP), data-distribution service (DDS), Zigbee, Z-Wave, lightweight machine-to-machine (LwM2M), or any combinations thereof. For example, sensor device 112 may wirelessly transmit distance measurement 136 to gateway 110, and gateway 110 may in turn send distance measurement 136 to computing system 102 via network 108. In other embodiments, sensor device 112 may not be an IoT sensor. In embodiments where sensor device 112 is not operable as an IoT sensor, sensor device 112 may transmit distance measurement 136 directly to computer system 102 via network 108 (e.g., without using gateway 110).

Sensor device 112 uses radio 124 to transmit distance measurements 136. Radio 124 is any transmitter or transceiver that is capable of wirelessly transmitting data. In some embodiments, for example, radio 124 is a Bluetooth transceiver. In these embodiments, distance measurements 136 are transmitted via Bluetooth to gateway 110 and/or remote computing system 102. In some embodiments, radio 124 is a Wi-Fi transceiver and distance measurements 136 are transmitted via Wi-Fi to gateway 110 and/or remote computing system 102.

Memory 122 of sensor device 112 may include any suitable set of instructions, logic, and/or code used by the device to perform the functions described herein. In particular embodiments, memory 122 may include a software application executable by processor 120 of sensor device 112 to perform one or more of the functions described herein.

While described above as providing distance measurements 136 to gateway 110 and/or computing system 102, in certain embodiments, sensor device 112 may be configured to perform one or more calculations on the distance measurements obtained from sensors 114a/b, and to transmit the results to gateway 110 and/or computing system 102. For example, in some embodiments, memory 122 may include instructions for converting the distance measurements obtained from sensors 114a/b into measures of the fill level of the cup dispenser in which sensor device 112 is installed. For instance, memory 122 may include instructions for converting the distance measurements obtained from sensors 114a/b into a percentage of the maximum number of cups that may be housed within the cup dispenser that are remaining within the dispenser, a number of cups remaining within the dispenser, and/or any other suitable measure of the fill level of the cup dispenser. In other embodiments, such calculations of the fill level of the cup dispenser are performed by computing system 102. Further details of the manner by which the distance measurements obtained by sensors 114a/b of sensor device 112 are converted into measures of the fill level of a cup dispenser (either by computing system 102 and/or sensor device 112) are provided below, in the discussion of FIG. 2.

Computing system 102 may be any appropriate computing system in any suitable physical form. As an example and not by way of limitation, computing system 102 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computing system 102 may include one or more computing systems 102; be unitary or distributed; span multiple locations; span multiple machines; span multiple data centers; or reside in a cloud, which may include one or more cloud components in one or more networks. Where appropriate, one or more computing systems 102 may perform without substantial spatial or temporal limitation one or more steps of one or more methods described or illustrated herein. As an example and not by way of limitation, one or more computing systems 102 may perform in real time or in batch mode one or more steps of one or more methods described or illustrated herein. One or more computing systems 102 may perform at different times or at different locations one or more steps of one or more methods described or illustrated herein, where appropriate. In some embodiments, computing system 102 includes an electronic display 144 that may alternately or additionally display alert 138.

Computing system 102 may be physically located within the same physical building in which sensors 114a/b are located, or physically located at a location remote from the physical building in which sensors 114a/b are located. For example, in certain embodiments, computing system 102 may be located in one or more remote servers (e.g. in the cloud).

Processor 126 is any electronic circuitry, including, but not limited to a microprocessor, an application specific integrated circuits (ASIC), an application specific instruction set processor (ASIP), and/or a state machine, that communicatively couples to memory 128 and controls the operation of computing system 102. Processor 126 may be 8-bit, 16-bit, 32-bit, 64-bit or of any other suitable architecture. Processor 126 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 126 may include other hardware that operates software to control and process information. Processor 126 executes software stored in memory 128 to perform any of the functions described herein. Processor 126 controls the operation and administration of computing system 102 by processing information received from sensor device 112, gateway 110, network 108, user device 106, and/or memory 128. Processor 126 may be a programmable logic device, a microcontroller, a microprocessor, any suitable processing device, or any suitable combination of the preceding. Processor 126 is not limited to a single processing device and may encompass multiple processing devices.

Memory 128 may store, either permanently or temporarily, data such as distance measurements 136, user preferences, operational software 130, and/or other information for processor 126. Memory 128 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices.

In certain embodiments, memory 128 may also store threshold information 132 and entity information 134. Computing system 102 may use threshold information 132 to determine whether or not to generate an alert 138 to transmit to device 106. For example, in response to calculating and/or receiving a measure of the fill level of a cup dispenser, computing system 102 may compare the measure of the fill level to one or more thresholds stored in threshold information 132. If the measure of the fill level compares unfavorably to the threshold(s), computing system 102 may generate alert 138 and transmit the alert to device 106. As a specific example, where the measure of the fill level of the cup dispenser corresponds to a percentage of the maximum number of cups housed within the dispenser that are remaining, threshold information 132 may include a minimum acceptable percentage against which the measure of the fill level is compared. If the measure of the fill level is equal to or below the minimum percentage, computing system 102 may generate alert 138. As another example, where the measure of the fill level of the cup dispenser corresponds to a number of cups remaining within the cup dispenser, threshold information 132 may include a minimum number of cups against which the measure of the fill level is compared. If the number of cups remaining within the cup dispenser, as reflected by the fill level, is equal to or below the minimum number of cups, computing system 102 may generate alert 138.

In certain embodiments, threshold information 132 may include a set of thresholds, each of which may be associated with a different alert level. For example, the set of thresholds may include: (1) a first threshold (e.g., 50% capacity remaining), which, if met, may trigger computing system 102 to generate an alert 138 associated with a low level of severity; (2) a second threshold (e.g., 20% capacity remaining), which, if met, may trigger computing system 102 to generate an alert 138 associated with a medium level of severity; (3) a third threshold (e.g., 5% capacity remaining), which, if met, may trigger computing system 102 to generate an alert 138 associated with a high level of severity; (4) a fourth threshold (e.g., 0% capacity remaining), which, if met, may trigger computing system 102 to generate an alert 138 associated with a highest level of severity; and/or (5) any other suitable thresholds. Device 106 may be configured to communicate alerts 138 to user 104 in different manners, depending on the severity level associated with the alert. For example, depending on the severity of a received alert 138, device 106 may be configured to (1) display the alert within a graphical user interface accessible to user 104 through device 106; (2) automatically generate an display a pop-up window that displays the alert; (3) generate a sound and/or vibration; and/or (4) perform any other suitable action to draw user 104's attention to the alert.

Threshold information 132 may include static thresholds, time-dependent thresholds, and/or information from which time-dependent thresholds may be determined. For example, a given entity may be busier (e.g., more individuals may enter the physical building associated with the entity per unit time) during certain periods of the day, and/or during certain days of the week. For example, an entity such as a restaurant may be busier during the lunch hour than from 3:00-4:00pm. The time-dependent thresholds that trigger computing system 102 to send alerts 138 may be higher during busier periods. For instance, the threshold for transmitting alert 138 to device 106 may be set at 50% capacity during busy periods, and 25% during non-busy periods. Computing system 102 may identify busy periods in any suitable manner. For example, in certain embodiments, computing system 102 may automatically identify busy periods by monitoring the number of transactions that occur within the physical building associated with the entity over time. In some embodiments, computing system 102 may receive identifications of busy times from user 104.

Any number of different factors may be used to adjust the thresholds against which the fill level of a cup dispenser is compared. As an example, in certain embodiments, time-dependent thresholds may also depend on the type of beverage for which the cups housed within the cup dispenser are designed to hold. For instance, a convenience store may experience a busy period during weekday mornings, from 7:00am-9:00am, during which demand for coffee is high, but demand for frozen beverages is low. Accordingly, computing system 102 may set the fill level threshold for a coffee cup dispenser at a higher value than a frozen drink cup dispenser during this time period. As another example, in certain embodiments, fill level thresholds may depend on the outside temperature. For instance, computing system 102 may set the fill level threshold for a frozen drink cup dispenser at a higher value when the outside temperature is above 90 degrees Fahrenheit. As a further example, in certain embodiments, computing system 102 may store threshold information 132 associated with multiple physical buildings associated with a given entity. For instance, threshold information may include multiple sets of thresholds, with each set of thresholds associated with a different physical building. In such embodiments, computing system 102 may be configured to adjust the fill level thresholds associated with a given physical building, based on changes made to the thresholds associated with another building. As a specific example, in certain embodiments, the entity may have recently begun operating within a new physical building. In such embodiments, computing system 102 may not have enough information from which to accurately identify busy periods within the building. The entity may, however, have also been operating in one or more nearby buildings (e.g., buildings that are within a given radius from the new building) for years. Accordingly, computing system 102 may use information from the one or more nearby buildings to identify likely busy periods for the new building. In particular, computing system 102 may set the time-dependent thresholds for use in the new building based on average values of the thresholds associated with the nearby building(s).

Entity information 134 may include information used by computing system 102 to determine the physical building from which distance measurements 136 have been received, and the devices 106 to which the corresponding alerts 138 should be transmitted. For example, in certain embodiments, for each physical building that computing system 102 is configured to monitor, entity information 134 may include identification numbers of the sensor devices 112 installed within the building, and the user devices 106 operated by workers 104 who work within the building. In such embodiments, sensor device 112 may be configured to transmit an identification number along with distance measurements 136 to computing system 102. Computing system 102 may then use this identification information to identify the physical building within which sensor device 112 is installed, and the devices 106 to which alerts 138 may be sent.

Modifications, additions, or omissions may be made to the systems described herein without departing from the scope of the invention. For example, system 100 may include any number of existing users 104, devices 106, networks 108, gateways 110, sensor devices 112, sensors 114*a/b*, processors 120, memories 122, radios 124, computing systems 102, processors 126, memories 128, and/or displays 144. The components may be integrated or separated. Moreover, the operations may be performed by more, fewer, or other components. Additionally, the operations may be performed using any suitable logic comprising software, hardware, and/or other logic.

II. Use of Sensor Measurements to Determine the Fill Level of a Cup Dispenser

A. Mounting Sensors within the Cup Dispenser

FIG. 2 illustrates an example cup dispenser 200 that includes sensors 114*a* and 114*b*. As illustrated in FIG. 2, cup dispenser 200 is configured to house a stack of cups 208 within the body 202 of the dispenser. Cup dispenser 200 includes a plunger 204 that is configured to engage a first cup 212 of the stack of cups 208, and to bias the stack of cups towards a discharge opening 210 of the cup dispenser, through which cups may be removed. For example, in certain embodiments and as illustrated in FIG. 2, a spring 206 coupled to plunger 204 is used to bias plunger 204 (and accordingly the stack of cups 208) towards discharge opening 210.

As illustrated in FIG. 2, sensor device 112 is added to cup dispenser 200 by coupling the device to plunger 204. As an example, in certain embodiments in which plunger 204 is solid, a cavity within the plunger may be created into which sensor device 112 may be mounted. As another example, in certain embodiments in which plunger 204 is solid, sensor 114a and sensor 114b may not be coupled to one another. In certain such embodiments, sensor 114a may be coupled to a first end of plunger 204 (e.g., the end nearest to first end 216 of body 202 of cup dispenser 200), and sensor 114b may be coupled to the opposite end of the plunger (e.g., the end nearest to the discharge opening 210 of body 202 of cup dispenser 200). In some embodiments, plunger 204 is hollow. In such embodiments, a surface 205 may be added within plunger 204, onto which sensor device 112 may be mounted. For example, sensor 114a may be mounted to surface 205, and sensor 114b may be mounted to the end of plunger 204 nearest discharge opening 210.

When coupled to plunger 204, sensor 114a is configured to generate a laser beam 214 that is directed towards the first end 216 of body 202, and which is reflected by the first end 216 of body 202 back to the sensor. Similarly, sensor 114b is configured to generate a laser beam 218 that is (1) directed towards the bottom 220 of the first cup 212 of the stack of cups 208, and which is reflected by the bottom 220 of first cup 212 back to the sensor, when stack of cups 208 is present, or (2) sent through discharge opening 210 of cup dispenser 200, when stack of cups 208 is not present within cup dispenser 200. In certain embodiments, when laser beam 218 is sent through discharge opening 210, it may be reflected by an object outside of cup dispenser 200 (e.g., a wall, a person, etc.) and reflected back towards the sensor. In some embodiments, when laser beam 218 is sent through discharge opening 210, it may be reflected in a manner such that the reflected beam is not received by sensor 114b.

Based on the time of flight of laser beam 214, sensor 114a determines a distance to first end 216. Similarly, based on the time of flight of laser beam 218, sensor 114b may determine a distance to bottom of cup 212 or a distance to an object located outside of cup dispenser 200. Sensor device 112 is then configured to transmit these measured distances to gateway 110 and/or computing system 102, as described above, in the discussion of FIG. 1.

B. Obtaining the Fill Level from the Sensor Measurements

Computing system 102 is configured to use the distances measured by sensor 114a and optionally 114b to determine the fill level of cup dispenser 200. As an example, in certain embodiments, computing system 102 is configured to store a baseline distance measurement 146 obtained from sensor 114a when cup dispenser is empty (i.e., stack of cups 212 are not housed within cup dispenser 200). In response to receiving a distance measurement 136 from sensor 114a, computing system 102 may subtract the measured distance 136 from the baseline distance, and divide the result by the baseline distance 146, to obtain a fill level measure 148 associated with a percentage capacity of cups remaining within body 202 of cup dispenser 200. In some embodiments, in response to receiving a distance measurement 136 from sensor 114a, computing system 102 may be configured to subtract the measured distance 136 from the baseline distance 146, and to divide the result by a cup density 152 (e.g., a number of cups per unit length), to obtain a fill level measure 148 related to a number of cups remaining within body 202 of cup dispenser 200. In certain embodiments, the cup density 152 may depend on the type of cup housed within body 202. In such embodiments, computing system 102 may be configured to use the distance measurement 136 obtained by sensor 114b to identify the cup type. In particular, for each potential cup type that may be housed within body 202 of cup dispenser 200, computing system 102 may store a distance from sensor 114b to the bottom of the cup 150, and a cup density 152 associated with the cup type. In response to receiving the distance 136 measured by sensor 114b, computing system 102 may compare the measured distance 136 to the distances 150 from sensor 114b to the bottom of each potential type of cup to identify the type of cup stored within the cup dispenser. Computing system 102 may then use cup density 152 associated with that cup type to calculate the measure 148 of the number of cups remaining within body 202 of cup dispenser 200.

Computing system 102 may also use the distance measurements 136 obtained from sensor 114b to determine when cup dispenser 200 is empty. In particular, in response to receiving a measured distance 136 from sensor 114b that is greater than the largest possible distance from sensor 114b to the bottom of a cup stored within the cup dispenser, computing system 102 may determine that no cups are housed within body 202 of cup dispenser 200 and that the distance measured by sensor 114b corresponds to the distance from the sensor to an object outside of cup dispenser 200. Similarly, if sensor 114b is unable to provide a distance to computing system 102 (e.g., because the laser beam emitted by the sensor is not reflected back to the sensor), computing system 102 may also determine that this is because no cups are housed within body 202.

While FIG. 2 illustrates the use of a pair of sensors—sensor 114a and sensor 114b, certain embodiments may include a single sensor 114a. Furthermore, while FIG. 2 illustrates the use of sensors 114a and 114b in conjunction with a cup dispenser that uses plunger 204 to bias stack of cups 208 towards discharge opening 218, a person of ordinary skill in the art would recognize that such sensors could be installed in other types of cup dispensers that do not necessarily use a plunger 204, to provide measurements from which the capacity of the cup dispenser may be determined.

III. Method for Automatically Monitoring the Fill Level of a Cup Dispenser

FIG. 3 illustrates an example method 300 (described in conjunction with elements of FIGS. 1 and 2) for automatically monitoring a cup dispenser 200 and alerting a user 104 when the fill level of the cup dispenser falls below a desired threshold.

During operation 302, the system uses sensor 114b to measure a first distance 218 in a direction towards the discharge opening 210 of cup dispenser 200. Sensor device 112 then transmits this first distance 218 to computing device 102. During operation 304 computing device 102 determines whether the first distance 218 is greater than a threshold 132. The threshold 132 may correspond to the distance from sensor 114b to the bottom of a cup of a maximum depth 150 that may be housed within cup dispenser 200, such that a distance measurement greater than this maximum depth 150 indicates that sensor 114b measured a distance to an object located outside of cup dispenser 200 (e.g., a person, a wall, etc.). If, during operation 304 computing system 102 determines that the first distance 218 is greater than the threshold 132, during operation 306 the system transmits an alert 138 to user device 106 indicating that cup dispenser 200 is empty.

If, during operation 304 computing system 102 determines that the first distance 218 is less than the threshold 132, during operation 308 the system uses sensor 114a to measure a second distance 214 in a direction away from the discharge opening 210 of the cup dispenser 200 and towards the end 216 of the cup dispenser. Sensor 114a then transmits this second distance 214 to computing system 102. During operation 310 computing system 102 uses the second distance 214 to calculate a fill level 148 of the cup dispenser. For example, computing system 102 may subtract the second distance 214 from a baseline distance 146 measured by sensor 114a when cup dispenser 202 was empty, and then divide the result by the baseline distance 146 to obtain a percentage of the maximum capacity of the cup dispenser associated with the cups remaining within cup dispenser 202. During operation 312 computing system 102 compares the calculated fill level 148 to a threshold 132. If, during operation 312 computing system 102 determines that the fill level 148 compares unfavorably to the threshold 132 (e.g., the percentage of the maximum capacity of cups remaining within the cup dispenser is less than a minimum percentage), during operation 314 computing system 102 transmits an alert 138 to user device 106, prompting user 104 to refill cup dispenser 200. On the other hand, if, during operation 312 computing system 102 determines that the fill level 148 compares favorably to the threshold 132, method 300 returns to operation 302, and the system continues to monitor the cup dispenser.

Modifications, additions, or omissions may be made to the methods described herein without departing from the scope of the disclosure. The methods may include more, fewer, or other operations. Additionally, operations may be performed in any suitable order. That is, the operations of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for providing a measure of a number of cups housed within a cup dispenser, wherein:
   the cup dispenser comprises:
      a body configured to house a stack of cups;
      a spring disposed within the body; and
      a plunger coupled to the spring, the plunger configured to:
         engage a first cup of the stack of cups; and
         bias the stack of cups toward a discharge opening defined by a first end of the body; and
   the system comprises:
      a first sensor coupled to the plunger and configured to:
         measure a distance from the plunger to a second end of the body, the second end opposite the first end; and
         transmit the measured distance across a network;
      a computing system communicatively coupled to the first sensor, the computing system comprising:
         a memory configured to store a threshold; and
         a hardware processor communicatively coupled to the memory, the hardware processor configured to:
            receive the measured distance from the network;
            determine, based on the measured distance, the measure of the number of cups housed within the cup dispenser; and
            in response to determining that the measure of the number of cups is less than the threshold, transmit an alert for display on a user device;
      a second sensor coupled to the plunger, the second sensor configured to:
         measure a second distance comprising at least one of:
            a distance from the plunger to a bottom of the first cup of the stack of cups, when the stack of cups is housed within the body; and
            a distance from the plunger to a position beyond the discharge opening, when the stack of cups is not housed within the body; and transmit the measured second distance across the network, wherein the hardware processor is further configured to:
receive the second measured distance from the network;
compare the second measured distance to a second threshold; and
in response to determining that the second measured distance is greater than the second threshold, transmit a second alert for display on the user device, the second alert indicating that the cup dispenser is empty.

2. The system of claim 1, wherein the first sensor comprises at least one of:
a sensor configured to measure the distance from the plunger to the second end of the body based on a time of flight of a laser beam pulse emitted by the first sensor and reflected back to the first sensor by the second end of the body; and
a sensor configured to measure the distance from the plunger to the second end of the body based on a time difference between emitting an ultrasonic pulse and receiving an echo pulse associated with the emitted ultrasonic pulse.

3. The system of claim 1, wherein determining the measure of the number of cups housed within the cup dispenser comprises:
determining a difference between a maximum distance from the plunger to the second end of the body and the measured distance, the maximum distance corresponding to a distance measured from the plunger to the second end of the body when no cups are housed within the body; and
calculating a ratio between (a) the difference between the maximum distance from the plunger to the second end of the body and the measured distance, and (b) the maximum distance.

4. The system of claim 1, wherein:
the memory is further configured to store a cup density corresponding to a number of cups per unit length of the body; and
determining the measure of the number of cups housed within the cup dispenser comprises:
determining a difference between a maximum distance from the plunger to the second end of the body and the measured distance, the maximum distance corresponding to a distance measured from the plunger to the second end of the body when no cups are housed within the body; and
dividing the difference between the maximum distance from the plunger to the second end of the body by the cup density.

5. The system of claim 1, wherein in response to determining that the second measured distance is less than the second threshold, determine a size of the cups of the stack of cups housed within the body.

6. The system of claim 5, wherein the measure of the number of cups housed within the cup dispenser comprises a number of cups determined based on the measured distance and the size of the cups of the stack of cups housed within the body.

7. A non-transitory computer-readable medium comprising instructions for providing a measure of a number of cups housed within a cup dispenser that, when executed by a hardware processor, cause the processor to:
receive, from a first sensor, a distance associated with the cup dispenser, wherein:
the cup dispenser comprises:
a body configured to house a stack of cups;
a spring disposed within the body; and
a plunger coupled to the spring, the plunger configured to:
engage a first cup of the stack of cups; and
bias the stack of cups toward a discharge opening defined by a first end of the body;
the first sensor is coupled to the plunger and configured to measure the distance associated with the cup dispenser; and
the distance associated with the cup dispenser corresponds to a distance from the plunger to a second end of the body, the second end opposite the first end;
determine, based on the distance associated with the cup dispenser, the measure of the number of cups housed within the cup dispenser; and
in response to determining that the measure of the number of cups is less than a threshold, transmit an alert for display on a user device;
wherein the instructions are further configured, when executed by the processor, to cause the processor to:
receive, from a second sensor, a second distance associated with the cup dispenser, wherein the second distance comprises at least one of:
a distance from the plunger to a bottom of the first cup of the stack of cups, when the stack of cups is housed within the body; and
a distance from the plunger to a position beyond the discharge opening, when the stack of cups is not housed within the body, wherein the second sensor is coupled to the plunger;
compare the second measured distance to a second threshold; and
in response to determining that the second measured distance is greater than the second threshold, transmit a second alert for display on the user device, the second alert indicating that the cup dispenser is empty.

8. The non-transitory computer-readable medium of claim 7, wherein the first sensor comprises at least one of:
a sensor configured to measure the distance from the plunger to the second end of the body based on a time of flight of a laser beam pulse emitted by the first sensor and reflected back to the first sensor by the second end of the body; and
a sensor configured to measure the distance from the plunger to the second end of the body based on a time difference between emitting an ultrasonic pulse and receiving an echo pulse associated with the emitted ultrasonic pulse.

9. The non-transitory computer-readable medium of claim 7, wherein determining the measure of the number of cups housed within the cup dispenser comprises:
determining a difference between a maximum distance from the plunger to the second end of the body and the measured distance, the maximum distance corresponding to a distance measured from the plunger to the second end of the body when no cups are housed within the body; and
calculating a ratio between (a) the difference between the maximum distance from the plunger to the second end of the body and the measured distance, and (b) the maximum distance.

10. The non-transitory computer-readable medium of claim 7, wherein determining the measure of the number of cups housed within the cup dispenser comprises:
- determining a difference between a maximum distance from the plunger to the second end of the body and the measured distance, the maximum distance corresponding to a distance measured from the plunger to the second end of the body when no cups are housed within the body; and
- dividing the difference between the maximum distance from the plunger to the second end of the body by a cup density, the cup density corresponding to a number of cups per unit length of the body.

11. The non-transitory computer-readable medium of claim 7, wherein the instructions are further configured, when executed by the processor, to cause the processor to determine a size of the cups of the stack of cups housed within the body, in response to determining that the second measured distance is less than the second threshold.

\* \* \* \* \*